United States Patent [19]

Haverstraw et al.

[11] 3,767,891

[45] Oct. 23, 1973

[54] ELECTRODE FOR ARC WELDING IN AIR

[75] Inventors: Robert Claire Haverstraw, Kirtland; George Gideon Landis, Pepper Pike Village, both of Ohio

[73] Assignee: The Lincoln Electric Company, Cleveland, Ohio

[22] Filed: May 7, 1971

[21] Appl. No.: 141,376

[52] U.S. Cl................. 219/146, 117/202, 117/205, 117/207, 219/137
[51] Int. Cl............................................ B23k 35/22
[58] Field of Search.................... 219/145, 146, 137, 219/74; 117/202–207; 148/24, 26

[56] References Cited
UNITED STATES PATENTS

| | | | |
|---|---|---|---|
| 3,177,340 | 4/1965 | Danhler............................ | 219/146 |
| 3,539,765 | 11/1970 | Duttera............................ | 219/146 |
| 3,643,061 | 2/1972 | Duttera............................ | 219/146 |
| 3,466,417 | 9/1969 | Chapman et al................... | 219/146 |
| 3,162,751 | 12/1964 | Robbins............................ | 219/137 |
| 3,513,289 | 5/1970 | Blake............................... | 219/146 |
| 3,627,574 | 12/1971 | Delong............................. | 117/206 |
| 3,585,352 | 6/1971 | Zvanut............................. | 219/146 |
| 3,461,270 | 8/1969 | Patton.............................. | 219/146 |
| 2,909,778 | 10/1959 | Landis et al....................... | 219/146 |
| 3,531,620 | 9/1970 | Arikawa et al.................... | 219/146 |

*Primary Examiner*—R. F. Staubly
*Assistant Examiner*—George A. Montanye
*Attorney*—Meyer, Tilberry & Body

[57] ABSTRACT

An electrode for electric arc welding in air containing alkali metal composites which comprise an alkali metal oxide in combination with one or more metal compounds of acidic or amphoteric nature, preferably iron oxide, manganese oxide, aluminum oxide or silicon dioxide. The alkali metal composite is less hygroscopic than the alkali metal compound it contains and is capable of being reduced to elemental alkali metal in the welding arc by reducing agents contained in the electrode. The alkali metal composite is provided in sufficient quantity so that the alkali metal obtained therefrom reduces the nitrogen content of the weld metal sufficiently to suppress nitrogen boil in the weld metal. Certain metal oxides and fluorides, preferably oxides of silicon, calcium, or aluminum and fluorides of calcium, barium, lithium or sodium are moisture barrier materials and may be included in the alkali metal composite to further enhance its resistance to absorption of moisture from the air.

41 Claims, No Drawings

ELECTRODE FOR ARC WELDING IN AIR

This invention pertains to the art of electric arc welding and more particularly to an improved electrode and method for electric arc welding in air.

The invention is particularly applicable to electric arc welding in air using a bare tubular electrode wherein flux material is on the inside of the tube, and will be described with particular reference thereto, although it will be appreciated that the invention has in some instances broader application.

In the art of arc welding, a rod or tube-shaped electrode of weld metal is energized by an electric power source and an electric arc is struck between the electrode and the workpiece. The heat of the arc melts the electrode and a spot on the workpiece into which the molten metal of the electrode is deposited. It is, generally speaking, desired to deposit a weld metal which is free of porosity and which has a high impact strength as well as satisfactory yield, tensile and elongation characteristics. The composition of the weld metal formed by the electrode must be carefully controlled to assure that the weld has these characteristics.

Porosity of the weld metal can be caused by various factors.

One cause of porosity is the reduction of iron oxide to iron by carbon present in the workpiece metal, thereby causing carbon monoxide and/or dioxide gas to form in the molten weld metal and to be entrapped as the metal solidifies. A principal source of iron oxide is the reaction of atmospheric oxygen with the molten surface of the weld bead and with the droplets of the molten electrode as they move through the arc.

Accordingly, it has been known to provide in the electrode composition components known as deoxidizers, or reducing agents, which, because of their affinity for oxygen, would be oxidized in preference to the molten weld metal, thus precluding the formation of iron oxide. Many materials, for example, aluminum, titanium, and silicon, to name but a few, are useful as reducing agents but tend to alloy with the weld metal and if present in excessive amounts to give it undesirable physical characteristics such as brittleness, i.e., low impact strength. Magnesium and calcium are also good reducing agents, but have such low boiling temperatures as to be less effective, and calcium is unstable in moist air.

Another, and a major cause of porosity, is the entry into the weld pool of atmospheric nitrogen which dissolves in the molten weld metal. The dissolved nitrogen gas seeks to come out of solution as the molten metal cools. The cooling metal solidifies around the escaping bubbles of gas, causing porosity of the metal. This phenomenon may be referred to as "nitrogen boil." It is known that the nitrogen boil may be suppressed by the use of excessive (over that required by deoxidization) reducing agents, such as aluminum, titanium and/or zirconium in the electrode composition. These excessive reducing agents react with nitrogen to form stable nitrides which are entrapped as an inclusion in the weld metal. Excessive amounts of these nitrides cause the resultant weld metal to have poor impact properties. Unreacted, excess aluminum also enters the weld metal and, in excessive amounts (generally, anything in excess of about 1 percent aluminum), also has an adverse effect on the metallurgical properties of the weld metal, as hereinabove mentioned.

Consideration of those problems led to the conclusion that what was needed was a way to exclude nitrogen from the arc plasma and weld zone, thereby preventing it from entering the weld metal, rather than only to attenpt to remove it after it has already entered. Accordingly, U.S. Pat. No. 2,909,648, dated Oct. 20, 1969, in the name of Landis et al. and assigned to the assignee of this application, describes the use of a metallic coating on the surface of a steel electrode which coating vaporizes in the heat of the arc to provide a metallic vapor shield around the arc, thereby excluding the atmosphere (and its nitrogen) from the vicinity of the weld pool. Subsequent work indicated that lithium metal was one of the best shielding metals and accordingly, copending patent application Ser. No. 2643, filed Jan. 13, 1970, now U.S. Pat. No. 3,691,340 in the name of G.G. Landis et al. and assigned to the assignee of this application, discloses the use of lithium metal as an arc shielding material to protect the welding arc by excluding the atmosphere therefrom. The lithium was believed to form a vapor shield around the droplets of the weld metal as they move from the arc into the weld pool. Regardless of the mechanism involved, it is known that introducing elemental lithium into the welding arc suppresses the nitrogen boil without adversely affecting the metallurgical properties of the weld metal. Lithium boils at a temperature lower than the melting point of steel and accordingly is boiled off so that it leaves no residue in the weld metal.

In addition, other problems of a manufacturing nature which application Ser. No. 2643 purports to solve, are involved in the application of metallic lithium to an electrode. The use of bonding and modifier metals in conjunction with the lithium is required, as well as cleaning and shielding the electrode from the atmosphere during the coating operation.

U.S. Pat. No. 3,488,469, dated Jan. 6, 1970, in the name of R. C. Buss and assigned to the assignee of this application, describes a tubular electrode containing, in addition to aluminum reducing agent and alloying agents, lithium carbonate. If lithium carbonate was introduced into the arc in sufficient quantities, the nitrogen boil was suppressed without the need for introducing a nitride forming material (such as aluminum) in amounts which would unduly affect the impact strength of the weld metal, and a non-porous, good impact strength weld metal was obtained.

Lithium carbonate however, is inefficient in that relatively large quantities of it are required in the formulation to suppress the nitrogen boil to the extent required to obtain a non-porous weld metal.

Further, the lithium carbonate employed by Buss decomposes to yield carbon dioxide gas in an explosive manner and in quantities which, when the lithium carbonate is present in amounts sufficient to suppress the nitrogen boil to the extent required to obtain substantially non-porous weld metal and satisfactory metallurgical properties, causes a spatter of molten weld metal. The spatter tends to disturb the operator, is unsightly, and has to be cleaned up after the welding operation is completed. Also, the release of carbon dioxide gas in such quantities tends to disrupt the welding arc.

Although the Buss patent indicates that it was not known precisely how the lithium carbonate functions, it implies that the excellent melting action of lithium carbonate and the closeness of its decomposition temperature (1310° C.) to the melting point of steel provides shielding of the weld metal from the atmosphere and its nitrogen.

Research carried out subsequent to the filing of the application which ultimately matured into the Buss patent noted that the composition described in the patent contained sufficient aluminum to reduce the lithium carbonate to elemental lithium in the heat of the arc, and that the satisfactory results obtained by Buss could be attributed to the presence of the elemental lithium.

Accordingly, further work was carried out to test this theory and to determine if other lithium compounds might serve as a source of elemental lithium in the welding arc. The results of this research are described in copending patent application Ser. No. 141,375, filed May 7, 1971 ("Method and Means for Electrode Welding") in the name of J. Parks and assigned to the assignee of this application. In the Parks application, lithium compounds, preferably bimetallic lithium silicates, lithium fluoride or lithium silicates are combined in the electrode with reducing agents which reduce the compounds to elemental lithium in the heat of the welding arc. Although the lithium silicates can be reduced by magnesium, aluminum or silicon, lithium fluoride, the preferred lithium compound, requires calcium as a reducing agent. Calcium is reactive with the moisture in the air and accordingly, according to the Parks application, is prepared in the form of air and storage-stable intermetallic compounds or alloyw with aluminum and magnesium.

While the use of such reducing agents served to reduce lithium fluoride to elemental lithium in the amounts required, it was found that in order that these calcium-containing reducing agents be capable of being safely stored and handled during the manufacturing operation, they had to be blended to extremely precise formulations. Even minor variations from the prescribed formulations created materials which were difficult or even dangerous to store and handle and which caused deterioration of the electrode in storage because of the highly reactive nature of elemental calcium with air and moisture. This very practical disadvantage of elemental calcium reducing agents, i.e., the exacting manufacturing specifications which must be met to provide a usable compound, indicated the need for non-hygroscopic lithium compounds which are capable of being reduced to elemental lithium in the heat of the welding arc without requiring the use of elemental calcium-containing reducing agents.

In order to meet the objective of developing lithium-containing materials which were stable in air for manufacturing and storage purposes and which could be reduced to elemental lithium in the welding arc without decomposing into gaseous constituents such as carbon dioxide in amounts which would disrupt the arc, it was reasoned that because they are strongly basic, lithium compounds would combine readily with metal compounds of an acidic or amphoteric nature to form compounds or mineral-like complexes. These compounds or complexes might be capable of being reduced to elemental lithium in the welding arc without requiring calcium reducing agents and without disruptive decomposition, and yet be sufficiently stable and not so hygroscopic as to preclude their use in a welding electrode.

The metal of the acid or amphoteric compound selected would also have to have desirable metallurgical properties in the proportions in which it would enter the weld metal, because the strong reducing potential of the reducing agent used in the welding electrode would undoubtedly reduce some of the metal compounds in the same manner as the lithium compound.

Research carried out in this area indicated that the propensity of elemental lithium to suppress nitrogen boil might be due to some property of lithium which it has in common with the other alkali metals and not, as suggested in the Parks application, merely the fact that lithium is lighter than nitrogen and tends therefore to displace it from the hot center of the welding arc.

Following this reasoning, compounds of mineral-type complexes containing potassium and sodium as the alkali metal were developed and tested as agents to eliminate or substantially reduce the nitrogen boil. Tests with potassium and sodium as the nitrogen boil-prevention agents were successful, and on this basis, it is believed that the remaining alkali metals, cesium and rubidium, would also be successful.

The present invention contemplates a new and improved welding electrode and method wherein alkali metal compounds or mineral-type complexes are reduced to elemental alkali metal in the welding arc without requiring the use of elemental calcium or other hygroscopic or hyperreactive reducing agents. Such alkali metal compounds or complexes shall be referred to as "composites" in this specification and in the attached claims, it being understood that the term "composites" includes the various alkali metal ferrate, silicate, manganate, aluminate, etc. compounds, quasi-compounds and mineral-type complexes of the invention, as more fully described hereinbelow. Some composites are believed to be true chemical compounds and some are believed to exist with only mineral-type bonding between molecules of constitutent compounds. It is not critical to either understanding or practicing the invention to know whether, for example, the composite lithium ferrate exists as the true chemical compounds $LiFeO_2$ and $Li_2Fe_5O_8$ (as suggested by X-ray diffraction analysis) or as a mineral-type complex of lithium oxide and iron oxide in fixed proportion, $Li_2O \cdot FeO_x$. (The oxygen content of the composite may vary over a wide range without affecting the critical properties of the composites.)

In accordance with the invention, there is provided an alkali metal composite which is reduced in the welding arc to the elemental alkali metal by aluminum, magnesium or other reducing agents. This alkali metal helps to suppress the nitrogen boil and results in a weld metal of good impact strength and no porosity.

Acidic or amphoteric metal compounds which were found to combine with alkali metal compounds to form suitable composites are the oxides of iron, manganese, silicon, aluminum, nickel titanium and cobalt, and it appears reasonable to assume that other metal compounds with similar acidic or amphoteric properties would also serve. Because they are expensive, oxides of nickel and cobalt are less desirable from a practical, economic point of view only. Aluminum oxide forms a composite with alkali oxides which, although usable, appears to be more difficult to reduce to elemental metal in the arc than are the other metal oxide composites.

In accordance with one aspect of the invention therefore, there are provided composites which comprise respectively, iron oxide, manganese oxide, aluminum oxide, silicon dioxide, nickel oxide, titanium dioxide and cobalt oxide combined with one or more alkali metal compounds in a composite which is non-hygroscopic relative to the corresponding alkali metal compound. The composites are prepared by combining selected alkali metal compounds and acidic or amphoteric metal compounds and heating the mixture, either alone or with other components of the final electrode flux material, at a temperature which will cause the alkali metal and acidic or amphoteric metal compounds to combine one with the other to form the alkali metal composites of the invention.

More than one alkali metal compound and more than one acidic or amphoteric metal compound may be combined to form a composite in accordance with the invention. While composites of the invention are less hygrosopic than the alkali metal compounds they contain, the degree of hygroscopicity, i.e., the tendency to absorb moisture from the air, may vary as between the various composites of the invention. Some composites are quite resistant to moisture absorption and may be kept in storage for extended periods of time, while others must be used soon after manufacture (or sealed in an air-tight packaging) in order to avoid excessive moisture pick-up.

In accordance with another aspect of the invention, therefore, moisture barrier materials, namely, silicon dioxide, calcium oxide, aluminum oxide and magnesium oxide, are included in the composite composition. Sodium fluoride, lithium fluoride, calcium fluoride and barium fluoride also are effective moisture barrier materials, and it appears reasonable to assume that the othr alkaline earth metal fluorides could also serve as moisture barrier materials. (The alkaline earth metals are beryllium, magnesium, calcium, strontium, barium and radium. Radium fluoride is, of course, not suitable from a practical point of view, being radioactive.) These materials enhance the ability of the alkali metal composites to resist absorption of moisture from the air.

For example, lithium composites are prepared by mixing a lithium compound, (preferably lithium carbonate) with iron oxide, along with silicon dioxide and other ingredients, as set forth in detail hereinbelow. The mixture is heated at high temperatures, preferably between about 1650°F and 1850°F., to form a mixture containing lithium oxide (probably in the composite $Li_2O \cdot FeO_x$), with the remaining ingredients in solid solution.

The proportion in which $Li_2O$ and $SiO_2$ are present in the finished flux material is important from a practical point of view, because mixtures which are too low in the proportion of lithium to silicon introduce too much silicon into the weld metal if sufficient lithium is provided to suppress the nitrogen boil. (It should be noted that in this regard the silicon dioxide is reduced to its elemental metal along with the lithium composite metals by the aluminum or other deoxidizer present.) On the other hand, if the proportion of lithium to silicon dioxide is too high, the flux material will be unduly sensitive to moisture pick-up notwithstanding the fact that the lithium oxide is bound up in the lithium ferrate composite.

Magnesium oxide, while it usually tends to aggravate the moisture absorption probelms, likewise usually makes it easier to reduce the alkali metal composite to elementary alkali metal in the arc. Calcium oxide is, as mentioned above, a moisture barrier material and in general has the reverse effect on the moisture-absorption and ease-of-reduction of the composite to alkali metal. That is, calcium oxide usually tends to abate the moisture-absorption problem but makes the composite more difficult to reduce. Consequently, these two compounds (magnesium oxide and calcium oxide) may be combined to obtain desired chemical and physical properties of the composite. Accordingly, in a limited aspect of the invention, magnesium oxide and calcium oxide, together with aluminum oxide, are used in conjunction with alkali metal oxide compound to control both moisture pick-up and ease of reduction to elementary alkali metal of the alkali metal oxide in the composite.

It is therefore a principle object of the invention to provide a welding electrode which is resistant to moisture absorption and gives a non-porous weld bead of high impact strength and good yield, tensile and elongation characteristics by releasing elemental alkali metal in the welding arc without requiring metallic calcium or other hyperractive reducing agents, thereby substantially reducing or eliminating the nitrogen boil in the weld metal without the addition of excessive quantities of deoxidizers in the weld metal.

It is another object of the invention to provide an electric welding electrode containing alkali metal composites, preferably of lithium, sodium and potassium, (although rubidium and cesium are not excluded) which are reducible to elemental alkali metals in the arc, which do not require the presence of elemental calcium-containing reducing agents in the flux, and which are not unduly hygroscopic.

Other objects and advantages of the invention will become apparent in the following detailed description of the preferred embodiments thereof which comprise a hollow tubular electrode containing a flux which includes a alkali metal composites in accordance with the invention.

The alkali metal composites of the invention may be prepared in combination with at least some of the other ingredients which will constitute the finished flux material, or with their precursors. That is, the alkali metal compound and the acidic or amphoteric metal compound and any moisture barrier materials may be combined with slagging agents which form a suitable slag in the welding operation, and with alloying agents which enter the weld metal and impart desired metallurgical characteristics thereto, or with the precursors of the foregoing. These ingredients may be combined and the entire mixture heated to form a constituent of the flux material. For example, calcium carbonate, a precursor, may be added to the mixture, and will be decomposed iin the heating step to the moisture barrier material calcium oxide.

Some of the ingredients may perform dual functions. The reducing agents or a portion thereof serve to reduce the alkali metal composite to elemental alkali metal in addition to serving as a deoxidizer. The moisture barrier material $SiO_2$, or a portion therof, is reduced to silicon and alloys with the weld metal, while CaO, also a moisture barrier material, enters the slag system as a useful component thereof.

At this point it should be noted that the term "steel shell" as used in the specification and claims refers to the steel welding electrode, whether in the form of a shell or a rod. In all cases, "percent of total electrode weight" or similar terms refer to the weight percent of the total combined weight of steel shell and other electrode ingredients.

The following Example I shows the preparation of a lithium ferrate composite in accordance with the invention.

(In all the Examples mill scale is described simply as "iron oxides" since its composition varies depending on the conditions under which it was produced and since it is not uniform, often including elemental iron particles with surface oxides.)

EXAMPLE I

A mixture of the following is prepared:

|  | Wt.% |
|---|---|
| Lithium carbonate ($Li_2CO_3$) | 33.5 |
| Mill scale (iron oxides) | 66.5 |

The mixture is heated in a kiln having a maximum temperature of 1850°F, with a residence time in th kiln of 1 hour. The resulting composite contains:

|  | Wt. % |
|---|---|
| Lithium oxide ($Li_2O$) | 15.8 |
| Iron oxide ($Fe_2O_x$) | 84.2 |

(The average value of $x$ ranges between about 1.6 to 3.0 inclusively.)

The oxygen content of the composite varies depending on the conditions of preparation. The total oxygen content in the samples analyzed varied between about 30.9 wt. % to about 37.6 wt. %. At 34.7 wt. % oxygen, the compound-composite lithium ferrate ($LiFeO_2$) is formed. A broader range of oxygen content is possible without unduly changing the sensitivity of the composite to moisture pick-up.

EXAMPLE II

A mixture of the following is prepared:

|  | Wt. % |
|---|---|
| Lithium carbonate ($Li_2CO_3$) | 25.5 |
| Mill scale (Iron oxides) | 45.2 |
| Silicon dioxide ($SiO_2$) | 10.4 |
| Calcium carbonate ($CaCO_3$) | 18.9 |

The mixture is heated in a kiln having a maximum temperature of 1850°F, with a residence time in the kiln of one hour. The resulting composite contains:

|  | Wt. % |
|---|---|
| Lithium oxide ($Li_2O$) | 13.6 |
| Silicon dioxide ($SiO_2$) | 13.6 |
| Calcium oxide (CaO) | 13.6 |
| Iron oxide ($Fe_2O_x$) | 59.2 |

(The average value of $x$ ranges between about 1.6 and 3.0 inclusively.)

EXAMPLE II-A

The amounts of $Li_2CO_3$, mill scale, $SiO_2$ and $CaCO_3$ are varied, so as to give a composite, after heating, of the following preferred range:

|  | Wt. % |
|---|---|
| Lithium oxide ($Li_2O$) | 10 – 18 |
| Silicon dioxide ($SiO_2$) | 10 – 28 |
| Calcium oxide (CaO) | 0 – 20 |
| Iron oxide ($Fe_2O_x$) | Remainder |

(The average value of $x$ ranges between about 1.6 and 3.0, inclusively.)

X-ray diffration analysis of the lithium ferrate composite shows strong lines for $Li_2O \cdot FeO$. However, oxygen analysis indicates that the composite can vary over a wide range of oxygen levels without being affected adversely in its sensitivity to moisture pick-up. Lines for the individual components are absent, indicating that the silicon dioxide and the calcium oxide are chemically involved with the lithium ferrate composite $Li_2O \cdot Fe_2O_x$.

As hereinabove stated, oxides besides iron oxide may be employed. Manganese oxide and nickel oxide are exemplified in Examples III and IV, respectively. Titanium dioxide may be used as well as silicon dioxide, aluminum oxide and cobalt oxide.

Similarly, satisfactory results were obtained using sodium in place of lithium, as shown in EXAMPLE V.

EXAMPLES III

A mixture of the following is prepared:

|  | wt. % |
|---|---|
| LIthium carbonate ($Li_2CO_3$) | 25.5 |
| Mill scale (iron oxides) | 39.6 |
| Silicon dioxide ($SiO_2$) | 10.4 |
| Calcium carbonate ($CaCO_3$) | 18.9 |
| Manganese ore (approx. 40% MnO) | 5.6 |

This mixture is heated in a kilm having a maximum temperature of 1,850°F. with a residence time in the kiln of 1 hour. The resulting composite contains:

|  | Wt.% |
|---|---|
| LIthium oxide ($Li_2O$) | 13.6 |
| Silicon dioxide ($SiO_2$) | 13.6 |
| Calcium oxide (CaO) | 13.6 |
| Iron oxide ($Fe_2O_x$) | 52.0 |
| Manganese oxide ($Mn_2O_x$) | 7.2 |

This material is a lithium manganate, lithium ferrate composite including silicon dioxide and calcium oxide as moisture barrier components, propbably of a single crystal structure, with the manganese substituting for the iron in a random manner.

(The average value of $x$ ranges between about 1.6 and 3.0, inclusively.)

EXAMPLES IV

A mixture of the following is prepared:

|  | Wt.% |
|---|---|
| Lithium carbonate ($Li_2CO_3$) | 25.5 |
| Mill scale (iron oxides) | 34.0 |
| Silicon dioxide ($SiO_2$) | 10.4 |
| Calcium carbonate ($CaCO_3$) | 18.9 |
| Manganese ore | 5.6 |
| NIckel sinter (NiO+Ni) | 5.6 |

The mixture is heated in a kiln having a maximum temperature of 1,850°F, with a residence time in the kiln of 1 hour. The resulting composite contains:

|  | Wt.% |
|---|---|
| Lithium oxide ($Li_2O$) | 13.6 |
| Silicon Dioxide ($SiO_2$) | 13.6 |
| Calcium oxide (CaO) | 13.6 |
| Iron oxide ($Fe_2O_x$) | 44.8 |
| Manganese oxide ($Mn_2O_x$) | 7.2 |
| Nickel oxide ($Ni_2O_x$) | 7.2 |

This material is a lithium ferrate, lithium nickelate, lithium manganate composite, including silicon dioxide and calcium oxide, as moisture barrier components, probably in a single crystal structure with the manganese and nickel substituting for the iron in a random manner.

(The average value of $x$ ranges between about 1.6 and 3.0, inclusively.)

EXAMPLE V

A mixture of the following is prepared:

| | Wt. % |
|---|---|
| Sodium carbonate ($Na_2CO_3$) | 23.5 |
| Barium fluoride ($BaF_2$) | 13.5 |
| Aluminum oxide ($Al_2O^2$) | 24.0 |
| Calcium carbonate ($CaCO_3$) | 19.5 |
| Silicon dioxide ($SiO_2$) | 19.5 |

The mixture is heated at 2,400°F in a suitable container until the mixture melts. The resulting composite material contains:

| | Wt.% |
|---|---|
| Sodium oxide ($Na_2O$) | 16.7 |
| Barium fluoride ($BaF_2$) | 16.5 |
| Aluminum oxide ($Al_2O_3$) | 29.5 |
| Calcium oxide (CaO) | 13.4 |
| Silicon dioxide ($SiO_2$) | 23.9 |

EXAMPLE V-A

The amount of sodium carbonate, barium fluoride, aluminum oxide, calcium carbonate and silicon dioxide are varied so as to give a composite, after melting, of the following preferred range:

| | Wt. % |
|---|---|
| Sodium oxide | 15 – 38 |
| Barium fluoride | 0 – 20 |
| Aluminum oxide | 0 – 34 |
| Calcium oxide | 0 – 15 |
| Silicon dioxide | Remainder |

The above material contains $SiO_2$ and $Na_2O$ and thus may be said to resemble a sodium glass. However, aside from the fact that the $Na_2O$ and $Al_2O_3$ are bound in a sodium aluminate composite, the finished material preferably has a silica content appreciably lower than that of glass. Glasses generally contain at least 60 percent silicon dioxide, and the lowest silica content glass, flint glass, contains at least about 45 percent silicon dioxide while the material prepared in accordance with the invention generally contains less than about 45 percent silicon dioxide and preferably not more than about 25 percent silicon dioxide.

Potassium may also be used as a substitute for lithium in accordance with the invention. A potassium-silica composite analogous to the sodium-silica composite described in Example V may be used. (In all cases, the nomenclature used to describe the composite is arbitrary, e.g., the potassium-silica composite of Example V could also be described as a sodium aluminate, sodium calcia, etc. composite.) The silica (silicon dioxide) and barium fluoride of Example V serve as moisture barrier components.

The flux composition provided in the inner core of or as a coating on a tubular electrode generally comprises about 20 percent of the total electrode weight. That is, the steel shell normally comprises 80% of the electrode weight with the flux core filling or coating providing the remainder. The composition of the steel shell is normally 0.05 to 0.07 percent carbon, about 0.50 percent manganese with the balance being iron. Broadly, the steel shell will comprise about 70 percent to about 90 percent of the total electrode weight. Example VI shows a preferred electrode composition including a lithium ferrate composite in accordance with the invention. Other alkali metal composites of the invention may be directly substituted in Example VI for the lithium composition shown.

EXAMPLE VI

| Flux | Wt. % of Electrode Preferred Amount | Preferred Range |
|---|---|---|
| Aluminum | 2.4 | 2.0–2.8 |
| Magnesium | 2.2 | 1.8–2.6 |
| Calcium fluoride | 2.0 | 1.75–2.25 |
| Barium fluoride | 4.0 | 3.5–4.5 |
| Sodium fluoride | 0.3 | 0.2–0.4 |
| Lithium composite material of Example II | 8.0 | 7.0–9.0 |
| Manganese | 0.4 | 0.2–0.6 |
| Carbon | 0.55 | 0.035–0.075 |
| Potassium silico-fluoride | 0.1 | 0.0–0.2 |
| Steel Shell | 80.55 | 79–82 |

With reference to Example VI above, and Examples VII and VIII following, the aluminum, manganese and carbon alloy with the weld metal and are important in imparting desirable metallurgical properties to the weld metal. Alkali metal composites of the general formula $M_2O \cdot Fe_2O_x$, $M_2O \cdot SiO_2$, $M_2O \cdot CoO$, $M_2O \cdot NiO$, $M_2O \cdot Mn_2O_x$, $M_2O \cdot Al_2O_3$ and $M_2O \cdot TiO_2$ (where $x$ may vary from 0.8 to 1.5, inclusively, and M is an alkali metal) are among those contemplated by the invention and may singly or in any combination be directly substituted, for example, for the lithium composite of Example II in the formula of Example VII. Further, the composites may include moisture barrier materials in combination with the other components. The composite materials from Examples II and V are highly oxidizing. The other components of the fluxes of the examples are used in the known manner as slagging agents to adjust the slag volume and slag freezing point as well as to modify the character of the arc. For example, potassium silico fluoride serves to "quench" the arc, increasing the voltage gradient across it and thereby increasing the amount of work done in the welding zone.

A preferred finished electrode composition containing a sodium aluminate composite is shown in Example VII.

EXAMPLE VII

| Flux | Wt. % of Electrode Preferred Amount | Preferred Range |
|---|---|---|
| Aluminum | 2.0% | 1.60–2.40% |
| Magnesium | 1.8% | 1.40–2.20% |
| Calcium fluoride | 3.5% | 2.5–4.5% |
| Sodium composite material of Example V | 15.0% | 13.0–17.0% |
| Carbon | 0.055% | 0.035–0.75% |
| Manganese | 0.4% | 0.2–0.6% |
| Steel Shell | 74.75% | 73.25–76.25% |

In a preferred embodiment of the invention, a hollow tube electrode of low carbon steel is formed around a flux material containing alkali metal composites in accordance with the invention, preferably, lithium, sodium or potassium composites. A hollow tube electrode is well suited to introduce, in accordance with one aspect of the invention, the alkali metal composite into the welding arc. The flux material also contains highly reactive reducing agents, preferably including aluminum, and may also contain iron powder to increase its bulk, so that the flux material completely fills the hollow electrode tube.

Example VIII shows another preferred finished electrode composition in accordance with the invention.

EXAMPLE VIII

| Flux | Wt.% of Electrode |
|---|---|
| Aluminum | 2.0 – 2.8 |

| | |
|---|---|
| Magnesium | 1.2 – 1.8 |
| Calcium fluoride | 1.5 – 2.0 |
| Barium fluoride | 7.0 – 9.5 |
| Sodium fluoride | 0.1 – 0.4 |
| Alkali metal composite | 3.0 – 5.0 |
| Nickel | 0.3 – 0.9 |
| Carbon | 0.035 0.075 |
| Potassium silico fluoride | 0.0 – 0.2 |
| Steel Shell | 79.0 –82.0% |

Example IX shows yet another preferred finished electrode composition in accordance with the invention.

EXAMPLE IX

| Flux | Wt. % |
|---|---|
| Aluminum | 1.7 – 2.2 |
| Magnesium | 1.2 – 1.8 |
| Calcium fluoride | 1.0 – 2.0 |
| Barium fluoride | 7.0 – 9.5 |
| Sodium fluoride | 0.1 – 0.4 |
| Nickel | 0.3 – 0.9 |
| Alkali metal composite | 3.0 – 5.0 |
| Carbon | 0.035 – 0.075 |
| Potassium silico fluoride | 0.0 – 0.2 |
| Steel Shell | 79.0 – 82.0 |

While it is possible to introduce enough elemental alkali metal into the electrode composition to preclude substantially any nitrogen entry into the weld metal, it is generally satisfactory to introduce only enough alkali metal to suppress the nitrogen boil to the point where the amount of nitrogen retained in the weld metal is not more than about 0.03 weight percent of the weld metal. An electrode content of about 0.2 to 0.7 percent by weight of reducible lithium, of about 0.4 to 0.9 percent by weight of reducible sodium and of about 0.5 to 1.0 percent by weight of reducible potassium, or pro-rata combinations of the foregoing, has been found sufficient under the conditions prevailing in the welding arc to maintain nitrogen at a level not greater than about 0.03 percent in the weld metal. By "reducible" metal, it is meant that which is actually reduced from the composite to metallic form in the arc. If the reduction mechanism is not 100 percent efficient, i.e., if some of the alkali metal composite is not reduced, then the total amount used in the electrode must be increased proportionately. Generally, it is preferred, in accordance with one aspect of this invention, to prepare an electrode containing sufficient alkali metal compounds to provide from about 0.2 percent to about 1.0 percent by weight reducible alkali metal in the electrode composition, which generally requires about 0.9 percent to about 10.0 percent by weight total alkali metal composite in the electrode composition. The amount of composite required depends, of course, upon the percent of composite weight due to alkali metal, and the extent of reduction of composite to alkali metal.

In general, the alkali metal composites of the invention suppress nitrogen boil and yield a non-porous weld metal with high impact values and good tensile and elongation characteristics.

A preferred electrode composition of the invention com-prises an admixture, in the following proportions, of highly reactive deoxidizers, alkali metal in a composite which is stable in storage yet reducible to elemental alkali metal in the welding arc by ordinary deoxidizers such as aluminum, alloying agents, iron powder and slagging agents. Naturally, other proportions of the components shown may be employed.

| Alkali metal obtained from | Wt. %, Defined Basis * |
|---|---|
| | Preferred Range |
| composite | 0.2–1.0% |
| Highly reactive deoxidizers | 0.5–6.0% |
| Total halides | 1.5–15.0% |
| Total alloying agents | 0.0–5.0% |
| Other slagging materials | 0.0–5.0% |
| Steel Shell | 70.0–90.0% |
| Iron powder | 0.0–15.0% |

\* (Alkali metal obtained from a composite refers to the stoichoimetric amount of lithium, sodium, potassium, rubidium, or cesium that would be extracted from the respective composite used if all the composite present is reduced. If the alkali metal percentage in the above table were described in terms of the corresponding alkali metal oxide composites, its value in the above table would be approximately 5 to 10 times as great as the 0.2 to 1.0 percent given for the alkali metal obtained. When the alkali composite is lithium ferrate or lithium manganate, the weight percent of composite would be between about 3 percent to about 9 percent of the total electrode weight. Lithium titanate and lithium aluminate composites would have to be present in somewhat greater amounts because they are less efficiently reduced to elemental lithium. Naturally, as the percentage of alkali metal present in any given composite decreases, more of the composite is required to provide the requisite amount of alkali.)

Highly reactive deoxidizers are aluminum, calcium, cerium, zirconium, magnesium, titanium, lithium, silicon, and carbon in elemental form, as alloys, or as intermetallic compounds.

The lanthanide series elements (those elements of atomic number 57 to 71) are also good deoxidizers but are generally quite expensive, and therefore not preferred for use from a practical point of view. (The lanthanide series elements are lanthanum, cerium, praseodymium, neodymium, promethium, samarium, europium, gadolinium, terbium, dysprosium, holmium, erbium, thulium, ytterbium, and lutecium.)

An aluminum deoxidizing system is strongly preferred and an aluminum-magnesium deoxidizing system is preferred because a residual amount of aluminum (about 0.5 percent and not more than 1.0 percent) in the weld metal does not detract from its metallurgical properties, and the oxides (or fluorides) of aluminum and magnesium formed by reduction of the alkali composite to elemental alkali metal enter the slag and give it desirable properties. Halides refer to metallic halides, preferably alkali metal fluorides, alkaline earth fluorides, and aluminum fluorides, although other metallic halides are not excluded.

Total alloying agents or iron powder refer to components that become part of the weld metal in the welding process. These components are added specifically to adjust the weld metal physical properties. Iron powder also serves to make up a minimum amount of core filling to facilitate loading and forming of the hollow rod electrode.

Other slagging materials are oxides, silicates, carbonates, or mixtures thereof. The principal function of these materials is to adjust the slag composition, melting point, wetting action and arc action, or to adjust the volume of slag.

Two or more of the alkali metal composites of the invention any any two or more deoxidizers may, of course, be combined in any given electrode, along with other conventional ingredients.

It is important in accordance with the invention that the alkali metal composites of the invention are not formed in situ by the heat of the welding arc, but are prepared in advance and then added to the electrode material. That is to say, the acidic/amphoteric metal oxide and any moisture barrier materials are reacted with the alkali compound at elevated temperatures, and the composite formed thereby is then blended into the electrode material. Formation of the composite attenuates the hygroscopic nature of the alkali compounds and permits the electrode to be held in storage without undue moisture pick-up. The extent of the composite-forming reaction may be measured by the extent to which the hygroscopic nature of the alkali compound is attenuated. Hygroscopicity is the tendency of a material to absorb moisture from the air, and it should be noted that formation of the composite attenuates the hydroscopic nature of the lithium compounds even when the compound denominated "moisture barrier materials" are not present. The moisture barrier materials have a pronounced effect in attenuating hygroscopicity even when present in relatively small amounts.

The composite obtained in accordance with the invention is more stable in storage than its constituent materials, and yet is capable of being reduced in the welding arc to elemental alkali metal. In preparing the composites, the mixture of materials is heated at a temperature high enough to form the composite (at least 1,650°F and preferably 1,850°F) for sufficient length of time to form the composite (at least one hour or until the material melts). Lithium composites may be prepared by heating the mixture at between about 1,650°F and 1,850°F, preferably at 1,850°F, for up to 12 hours, preferably for 1 hour. Sodium composites may be prepared by heating the mixture of materials at a temperature of between about 2,200°F and about 2,600°F, preferably at 2,400°F until it melts.

The application of Parks filed concurrently herewith describes arrangements and methods for reducing lithium compounds in the heat of the arc to metallic lithium so that metallic lithium in the arc can act to exclude nitrogen. To avoid the problems of hygroscopicity, Parks employed the more stable non-hygroscopic lithium compounds which in turn required a more active reducing agent such as calcium which in turn had to be treated so as to reduce its hygroscopic tendencies.

The present invention has basically treated the less stable, more hygroscopic alkali metal compounds so as to substantially reduce their hygrosopic tendencies by forming them into composites and then to use reducing agents which are sufficiently active to reduce these alkali metal composites to the basic metal in the heat of the arc. By so doing, it has been discovered that even the heavy alkali metals will perform the same function as lithium, namely of excluding nitrogen from the arc. By heavy alkali metals is meant all of the alkali metals excluding lithium. Thus, if the hygroscopic tendencies of the heavy alkali metal compounds can either be ignored or reduced by manufacturing the electrode under very low humidity conditions and/or storing the electrode until actual use under low humidity conditions, or using the electrode immediately after manufacture, it is possible to use, in accordance with the invention, the hygroscopic (non-composite) heavy alkali metal compounds in combina-tion with the reducing agent "sufficiently active" to reduce the alkali metal compound and produce free alkali metals in the arc.

The term "sufficiently active" is important. For example, some heavy alkali metal compounds are reduced by reducing agents which are incapable of reducing other heavy alkali metal compounds.

For example, aluminum and titanium are not "sufficiently active" reducing agents to reduce sodium, lithium, or potassium fluoride. For this reason, examples 1-4, 8, 9 and 13 of Landis et al. U.S. Pat. No. 2,909,778 are distinguishable from this phase of the present invention. Aluminum will, however, reduce heavy alkali silicofluoride.

For the heavy alkali metal fluorides as non-composites, the most suitable reducing agents are aluminum, magnesium, calcium, carbon and the lanthanide series elements.

Among the various heavy alkali metal compounds the oxides, fluorides, silico fluorides and silicates are commonly available and may be used as the heavy alkali metal compounds in accordance with the invention. An example of a welding electrode employing a potassium silico fluoride heavy alkali metal compound and aluminum reducing agent is as follows:

|  | Wt. % |
| --- | --- |
| Magnesium | 11–1.5 |
| Aluminum | 2.5–3.5 |
| Calcium fluoride | 7.6–9.6 |
| Potassium silico fluoride | 1.5–2.5 |
| Mill scale (iron oxides) | 4.5–7.5 |
| Manganese | 0.2–0.6 |
| Steel Shell | 78.5–81.5 |

It will be apparent that upon reading and understanding of the above, many modifications and alterations of the described invention will occur to those skilled in the art. It is intended to include all such modifications and alterations, insofar as they fall within the spirit and scope of the disclosed invention, in the appended claims or the equivalents thereof.

What is claimed is:

1. An arc welding electrode comprising a steel shell in combination with flux material, said flux material containing as an essential ingredient thereof,
    a. at least one alkali metal(s) in the form of alkali metal composite(s), said composite(s) comprising the reaction product of an alkali metal oxide and an acidic or amphoteric metal compound, said composite(s) being present in an amount sufficient to limit the amount of nitrogen retained in the weld metal to not more than about 0.03 percent by weight of the weld metal, and
    b. at least one reducing agent(s) capable of reducing said alkali metal composite(s) to elemental alkali metal in the welding arc and present in at least the stoichiometric amount necessary to so reduce all of said alkali metal composite(s).

2. The electrode of claim 1 wherein said acidic or amphoteric metal compounds are metal oxides.

3. The electrode of claim 2, wherein said metal oxides comprise one or more metal oxides selected from the class consisting of oxides of iron, manganese, silicon, aluminum, nickel titanium and cobalt.

4. The electrode of claim 1, wherein said alkali metals comprise one or more metals selected from the class consisting of lithium, sodium, potassium, cesium and rubidium.

5. The electrode of claim 1 wherein said alkali metal composites are selected from the class consisting of compounds of the general formula $M_2O \cdot Fe_2O_x$, $M_2O \cdot SiO_2$, $M_2O \cdot AlO_3$, $M_2O \cdot Al_2O_3$, $M_2O \cdot CoO$, $M_2O \cdot NiO$, $M_2O \cdot Mn_2O_x$, $M_2O \cdot TiO_2$, and mixtures thereof, where M is the alkali metal and where $x$ varies between 1.6 and 3.0.

6. The electrode of claim 1 wherein said alkali metal composite comprises between about 0.9 percent and about 10 percent of the total electrode weight.

7. The electrode of claim 1 wherein said reducing agent comprises between about 0.5 percent and about 6.0 percent of the total electrode weight.

8. The electrode of claim 1 wherein said reducing agents comprise one or more reducing agents selected from the class consisting of aluminum, magnesium, calcium, lithium, cerium, zirconium, silicon, titanium, carbon, and alloys or intermetallic compounds thereof.

9. The electrode of claim 1 wherein said reducing agents comprise one or more deoxidizers selected from the class consisting of aluminum, magnesium and alloys or intermetallic compounds thereof.

10. The electrode of claim 1 wherein said reducing agents comprise one or more deoxidizers selected from the class consisting of the lanthanide series elements.

11. The electrode of claim 1 wherein at least one of said composites further include at least one moisture barrier material selected from the class consisting of calcium oxide, silicon dioxide, magnesium oxide, aluminum oxide, lithium fluoride, sodium fluoride, barium fluoride and calcium fluoride.

12. The electrode of claim 1 additionally including at least one moisture barrier material selected from the class consisting of the alkaline earth metal fluorides.

13. The electrode of claim 1 wherein said composite is a lithium composite and the lithium content (measured as elemental lithium) of said electrode is between about 0.2 percent and about 0.7 percent of the total electrode weight and said reducing agent constitute between about 0.5 percent to about 6.0 percent of the total electrode weight.

14. The electrode of claim 1 wherein said composite is $Li_2O \cdot Fe_2O_x$, said reducing agent is selected from the class consisting of aluminum, magnesium and mixtures thereof, and x is between about 1.6 and 3.0.

15. The electrode of claim 1 having the following composition measured as weight percent of the total electrode weight:

| | |
|---|---|
| reducible alkali metal contained in said composite(s) | 0.2–1.0 |
| reducing agents | 0.5–6.0 |
| halides | 1.5–15.0 |
| iron powder | 0.0–15.0 |
| steel shell | 70.0–90.0 |
| other slagging materials | 0.0–5.0 |
| total alloying agents | 0.0–5.0 | wherein the reducing agents are selected from the class consisting of aluminum, magnesium, calcium, cerium, zirconium, titanium, lithium, silicon, carbon, alloys or compounds of any of the foregoing, and any mixtures thereof, and the halides are selected from the class consisting of alkali metal fluorides, alkaline earth metal fluorides, aluminum fluoride, and mixtures thereof.

16. The welding electrode of claim 15 wherein the alkali metal composite is a lithium composite and lithium is present in said composite in amounts between about 0.2 percent and 1.0 percent of the total electrode weight.

17. The welding electrode of claim 15 wherein the halides are selected from the class consisting of calcium fluoride, barium fluoride and mixtures thereof.

18. The electrode of claim 1 wherein said alkali metal composite is a lithium composite and said composite is present in an amount sufficient to provide at least about 0.2 weight percent (of the total electrode weight) of reducible lithium in the electrode.

19. The electrode of claim 1 wherein said alkali metal composite is a sodium composite and said composite is present in an amount sufficient to provide at least about 0.4 weight percent (of the total electrode weight) of reducible sodium in the electrode.

20. The welding electrode of claim 19 wherein sodium is present in amounts between about 0.4 to 0.9 percent of the total electrode weight.

21. The electrode of claim 1 wherein said alkali metal composite is a potassium composite and said composite is present in an amount sufficient to provide at least about 0.5 weight percent (of the total electrode weight) of reducible potassium in the electrode.

22. The electrode of claim 21 wherein potassium is present in said composite in amounts between about 0.5 percent to about 1.0 percent of the total electrode weight.

23. The welding electrode of claim 1 wherein said one or more alkali metals are selected from the class consisting of sodium, potassium, rubidium, and cesium, and said one or more reducing agents are selected from the class consisting of aluminum, carbon, magnesium, calcium and the lanthanide series elements.

24. An arc welding electrode comprising a steel shell in combination with flux material, said flux material containing as an essential ingredient thereof,
   a. at least one heavy alkali metal compound, said heavy alkali metal compound being present in an amount sufficient to limit the amount of nitrogen retained in the weld metal to not more than about 0.03 percent by weight of the weld metal, and
   b. in combination with the foregoing, at least one reducing agent sufficiently active to reduce said heavy alkali metal compounds to the corresponding heavy alkali metal and present in at least the stoichiometric amount necessary to so reduce all of said heavy alkali metal compound.

25. The electrode of claim 33 wherein said heavy alkali metal compounds are selected from the class consisting of compounds of sodium, potassium, cesium or rubidium.

26. The electrode of claim 24 wherein the reducing agents are selected from the class consisting of aluminum, magnesium, calcium, carbon, and the lanthanide series elements.

27. The electrode of claim 26 wherein the heavy alkali metal compounds include silico fluorides and the reducing agents include aluminum.

28. The electrode of claim 27 wherein the silicon fluorides include potassium silico fluoride.

29. The electrode of claim 24 wherein said heavy alkali metal compound is sodium and said compound is present in an amount sufficient to provide at least about 0.4 percent (of the total electrode weight) of reducible sodium in the electrode.

30. The electrode of claim 29 wherein between about 0.4 and 0.9 percent (of the total electrode weight) of reducible sodium is present in the electrode.

31. The electrode of claim 29 wherein between about 0.5 and 1.0 percent (of the total electrode weight) of reducible potassium is present in the electrode.

32. The electrode of claim 24 wherein said heavy alkali metal compound is potassium and said compound is present in an amount sufficient to provide at least about 0.5 percent (of the total electrode weight) of reducible potassium in the electrode.

33. The electrode of claim 25 wherein the heavy alkali metal compounds are one or more compounds selected from the class of oxides, fluorides, silico fluorides and silicates.

34. A welding electrode comprising a steel shell in combination with flux material, said flux material having the following approximate range of composition in weight percent of total electrode weight:

| | |
|---|---|
| Aluminum | 2.0–2.8 |
| Magnesium | 1.2–1.8 |
| Calcium fluoride | 1.5–2.0 |
| Barium fluoride | 7.0–9.5 |
| Sodium fluoride | 0.1–0.4 |
| Alkali metal composite | 3.0–5.0 |
| Nickel | 0.3–0.9 |
| Carbon | 0.035–0.075 |
| Potassium silico fluoride | 0.0–0.2 |
| Steel shell | 79.0–82.0% |

35. A welding electrode comprising a steel shell in combination with flux material, said electrode having the following approximate range of compositions in weight percent of the total electrode weight:

| | |
|---|---|
| Magnesium | 0.0–1.5 |
| Aluminum | 2.5–3.5 |
| Calcium fluoride | 7.6–9.6 |
| Potassium silico fluoride | 1.5–2.5 |
| Mill scale (iron oxides) | 4.5–7.5 |
| Manganese | 0.2–0.6 |
| Steel shell | 78.5–81.5 |

36. A welding electrode comprising a steel shell in combination with flux material, said electrode having the following approximate range of compositions in weight percent of the total electrode weight:

| | |
|---|---|
| Aluminum | 1.60–2.40% |
| Magnesium | 1.40–2.20% |
| Calcium fluoride | 2.50–4.50% |
| Sodium composite | 13.0–17.0% |
| Carbon | 0.035–0.075% |
| Manganese | 0.2–0.6% |
| Steel rod | 73.25–76.25% | wherein said sodium composite has the following approximate range of compositions in weight percent of the total composite weight:

| | |
|---|---|
| Sodium oxide | 15.0–38.0% |
| Barium fluoride | 0.0–20.0% |
| Aluminum oxide | 0.0–34.0% |
| Calcium oxide | 0.0–15.0% |
| Silicon dioxide | Remainder. |

37. A welding electrode comprising a steel shell in combination with flux material, said electrode having the following approximate range of composition in weight percent of total electrode weight:

| | |
|---|---|
| Aluminum | 1.7–2.2 |
| Magnesium | 1.2–1.8 |
| Calcium fluoride | 1.0–2.0 |
| Barium fluoride | 7.0–9.5 |
| Sodium fluoride | 0.1–0.4 |
| Nickel | 0.3–0.9 |
| Alkali metal composite | 3.0–5.0 |
| Carbon | 0.035–0.075 |
| Potassium silico fluoride | 0.0–0.2 |
| Steel shell | 79.0–82.0 |

38. A welding electrode comprising a steel shell in combination with flux material, said electrode having the following approximate range of composition in weight percent of total electrode weight:

| | |
|---|---|
| Aluminum | 2.0–2.8% |
| Magnesium | 1.8–2.6% |
| Calcium fluoride | 1.75–2.25% |
| Barium fluoride | 3.5–4.5% |
| Sodium fluoride | 0.2–0.4% |
| Alkali metal composite | 7.0–9.0% |
| Manganese | 0.2–0.6% |
| Carbon | 0.035–0.075% |
| Potassium silicofluoride | 0.0–0.2% |
| Steel shell | 79.0–82.0% | wherein said alkali metal composite comprises the reaction product of an alkali metal oxide and an acidic or amphoteric metal compound.

39. The welding electrode of claim 38 wherein said alkali metal composite is a lithium composite.

40. The welding electrode of claim 39 wherein said lithium composite has the following range of composition in weight percent of the total lithium composite weight:

| | |
|---|---|
| Lithium oxide | 10.0–18.0% |
| Silicon dioxide | 10.0–28.0% |
| Calcium oxide | 0.0–20.0% |
| Iron Oxide | Remainder. |

41. The welding electrode of claim 40 wherein said lithium composite material has the following approximate composition in weight percent of the total composite weight:

| | |
|---|---|
| Lithium oxide | 13.6 |
| Silicon dioxide | 13.6 |
| Calcium oxide | 13.6 |
| Iron oxide | 59.2 |

* * * * *

UNITED STATES PATENT OFFICE
CERTIFICATE OF CORRECTION

Patent No. 3,767,891      Dated October 23, 1973

Inventor(s) Robert Claire Haverstraw, George Gideon Landis

It is certified that error appears in the above-identified patent and that said Letters Patent are hereby corrected as shown below:

Column 1, line 66, cancel "metallurgical" and insert --impact-- in lieu thereof.

Column 10, line 22, cancel "0.8 to 1.5" and insert --1.6 to 3.0-- in lieu thereof.

Signed and sealed this 2nd day of April 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,767,891     Dated October 23, 1973

Inventor(s) Robert Claire Haverstraw and George Gideon Landis

It is certified that error appears in the above-identified patent and that said Letters Patent are hereby corrected as shown below:

Column 3, line 28, delete "alloyw" and substitute therefor --- alloys ---.

Column 4, line 54, insert a comma (,) between "nickel" and "titanium".

Column 5, line 63, delete "probelms" and substitute therefor --- problems ---.

Column 6, line 37, delete "a" therefrom.

Column 6, line 53, delete "iin" and substitute therefor --- in ---.

Column 7, line 19, delete "th" and substitute therefor --- the ---.

Column 8, line 20, delete "LIthium" and substitute therefor --- Lithium ---.

Column 8, line 29, delete "LIthium" and substitute therefor --- Lithium ---.

FORM PO-1050 (10-69)

Page 2

UNITED STATES PATENT OFFICE
CERTIFICATE OF CORRECTION

Patent No. 3,767,891  Dated October 23, 1973

Inventor(s) Robert Claire Haverstraw and George Gideon Landis

It is certified that error appears in the above-identified patent and that said Letters Patent are hereby corrected as shown below:

Column 16, the first line in claim 25, delete "33" and substitute therefor --- 24 ---, so that the dependency of claim 25 is changed from claim 33 to claim 24.

Column 16, second line of claim 27, delete "silico flourides" and substitute therefor --- silicofluorides ---.

Column 16, 1st and 2nd lines of claim 28, delete "silicon flourides" and substitute therefor ---silicofluorides ---.

Column 16, second line of claim 28, delete " silico fluoride" and substitute therefor --- silicofluoride ---.

Column 16, the first line of claim 31, delete "31" and substitute therefor --- 32 ---; delete "29" and substitute therefor --- 31 ---; and Column 16, the first line of claim 32, delete "32" and substitute therefor --- 31 ---: so that claim 32 is re-numbered as claim 31 and claim 31 is re-numbered as claim 32 and is dependent from re-numbered claim 31.

FORM PO-1050 (10-69)  USCOMM-DC 60376-P69

UNITED STATES PATENT OFFICE
CERTIFICATE OF CORRECTION

Patent No. 3,767,891     Dated October 23, 1973

Inventor(s) Robert Claire Haverstraw and George Gideon Landis

It is certified that error appears in the above-identified patent and that said Letters Patent are hereby corrected as shown below:

Column 10, line 11, delete "0.55" and substitute therefor --- 0.055 ---.

Column 11, line 6 and line 19, delete "silico fluoride" and substitute therefor --- silicofluoride ---.

Column 11, line 58, delete "com-prises" and substitute therefor --- comprises ---.

Column 12, line 54, delete the first occurrence of the word "any" and substitute therefor --- and ---.

Column 13, line 56, delete "combina-tion" and substitute therefor --- combination ---.

Column 14, line 8, delete "silico fluorides" and substitute therefor --- silicofluorides ---.

Column 14, lines 12 and 18, delete "silico fluoride" and substitute therefor --- silicofluoride ---.

Column 14, the last line in claim 3, insert a comma (,) between "nickel" and "titanium".

Page 4

UNITED STATES PATENT OFFICE
CERTIFICATE OF CORRECTION

Patent No. 3,767,891     Dated October 23, 1973

Inventor(s) Robert Claire Haverstraw and George Gideon Landis

It is certified that error appears in the above-identified patent and that said Letters Patent are hereby corrected as shown below:

Column 17, the third line of claim 33, delete "silico fluo" and substitute therefor --- silicofluo ---.

Column 17, the 13th line of claim 34, and the 8th line of claim 35, delete "silico fluoride" and substitute therefor --- silicofluoride ---.

Column 18, the 13th line of claim 37, delete "silico fluoride" and substitute therefor --- silicofluoride ---.

Signed and sealed this 8th day of October 1974.

(SEAL)
Attest:

McCOY M. GIBSON JR.
Attesting Officer

C. MARSHALL DANN
Commissioner of Patents